United States Patent
Graewe et al.

(12)

(10) Patent No.: US 6,428,843 B1
(45) Date of Patent: Aug. 6, 2002

(54) PROCESS FOR RECYCLING OF POWDER COATING WASTE

(75) Inventors: Rene Graewe, Essenbach; Armin Rettig, Saarbruecken, both of (DE)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 09/669,427

(22) Filed: Sep. 25, 2000

(51) Int. Cl.$^7$ ................................................ B05D 7/00
(52) U.S. Cl. ........................ 427/180; 427/222; 427/345; 427/393.5
(58) Field of Search .................................. 427/345, 180, 427/195, 201–203, 385.5, 393.5, 212, 222; 521/40; 241/22, 65

(56) References Cited

FOREIGN PATENT DOCUMENTS

| DE | 4028567 | | 12/1992 |
|----|---------|---|---------|
| EP | 0 683 199 A2 | | 11/1995 |
| EP | 0 982 380 A1 | | 3/2000 |
| WO | 96/15891 | * | 5/1996 |
| WO | 98/33848 | | 8/1998 |
| WO | 00/15705 | | 3/1999 |
| WO | 99/23068 | | 5/1999 |
| WO | 00/15705 | * | 3/2000 |
| WO | 99/23176 | | 5/2000 |

* cited by examiner

*Primary Examiner*—Fred J. Parker

(57) ABSTRACT

A process for the recycling of polymeric powder coating waste involves the steps of contacting polymeric powder coating chips with the powder coating waste to form a combination, by applying the powder coating waste to at least a portion of the surface of the powder coating chips, followed by heating the combination to a temperature and for a period of time sufficient to firmly bond the powder coating waste to the powder coating chips.

9 Claims, No Drawings

PROCESS FOR RECYCLING OF POWDER COATING WASTE

FIELD OF THE INVENTION

The invention relates to the recycling of powder coating waste.

BACKGROUND OF THE INVENTION

The preparation of powder coatings is mostly carried out by extruding the powder coating ready formulated by dry mixing of all the required components (powder coating fresh material) in the form of a paste-like melt, cooling off of the melt, coarse comminution into so-called powder coating chips, fine milling (grinding) and subsequent sieving and classifying to desired grain fineness (powder coating classification). Powder coating material that is too coarse-grained (high grain) on sieving can again be fine-milled. Powder coating material that is too fine-grained (low grain) represents waste.

Powder coating waste also arises in the form of powder coating overspray during the powder coating application.

Powder coating waste should if possible be recovered as powder coating to be employed for the original use, not only because of environmental considerations, but also because powder coatings are precious materials.

Various methods which allow recycling of powder coating waste to be used for the original purpose are described in the patent literature.

DE-A-40 28 567 thus describes direct recycling of powder coating overspray by addition to the powder coating fresh material or during extrusion. The process requires considerable expenditure during extrusion of the finely divided material.

In WO 96/15891 pressing of powder coating waste into friable tablets, which are then extruded together with powder coating fresh material, is described.

It is known from EP-A-0-683 199 to form a layer of powder coating waste, to expose the latter to heat, wherein the powder coating particles coalesce without degradation or cross-linking of the powder coating. IR-radiators can serve as the heat source. The coalesced powder coating particles are then again extruded alone or together with powder coating fresh material.

The processes known from DE-A-40 28 567, WO 96/15891 and EP-A-0-683 199 include a re-extrusion of the powder coating waste. This is linked to the danger of a too high thermal load.

WO 98/33848 describes the agglomeration of finely divided powder coating residues under the influence of pressure. The agglomerates can be returned to the powder coating preparation process.

WO 99/23068 and WO 99/23176 describe compacting of powder coating waste by applying pressure. The compacted powder coating waste can be ground together with fresh powder coating material that is to be ground.

The processes known from WO 98/33848, WO 99/23068 and WO 99/23176 require the application of pressure by suitable pressing devices.

WO 00/15705 describes the heating of powder coating fine grain without melting or cross-linking it completely. The powder coating fine grain thereby becomes sufficiently sticky and forms an agglomerated mass, which is treated further after cooling off in order to prepare powder coating particles therefrom having the desired particle size. The agglomerated mass is a powder coating material which is not convenient in operation.

EP-A-0 982 380 describes the preparation of powder coating particles having a particle size suited for application by agglomeration of powder coating fine grain by heat and preferably with the use of auxiliary products promoting the agglomeration. The process is extremely difficult to control due to the high requirements concerning the particle size distribution of the powder coating suited for application.

An object of the invention is to provide a simple process for recycling powder coating waste. It should be possible to carry out the process without pressure, i. e. without application of pressing forces onto the powder coating waste. The powder coating material to be recycled should be subjected as little as possible to heat. There should be no obligation to add auxiliary products, as these would necessarily bring about a change in the composition of the powder coating or would have to be removed.

SUMMARY OF THE INVENTION

In its broadest aspect, the invention provides a process for recycling powder coating waste comprising the steps of:
intimately contacting powder coating waste to powder coating chips; and
heating the combination to bond the powder coating waste to the powder coating chips.

This and other aspects of the invention will become apparent on a further reading of the specification.

DETAILED DESCRIPTION OF THE EMBODIMENTS

In the process according to the invention, powder coating waste is recycled. Powder coating waste is coating powder having particle sizes or particle size distributions which are not suitable for powder coating applications or which deviate from the theoretical value. In effect, the term refers to a powder coating composition that cannot be used for its intended application. The powder coating wastes have average particle sizes ($d_{50}$) in the range of 1 to 100 $\mu$m for example. Examples of powder coating waste are powder coating-overspray having for example an average particle size ($d_{50}$) in the range of 10 to 100 $\mu$m, low grind according to the powder classification, for example having an average particle size ($d_{50}$) in the range of 1 to 20 $\mu$m, faulty powder coating batches having particle size distributions which are not within the theoretical values or powder coatings which do not conform to the theoretical values of particle size distribution, for example because of a faulty or overlong storage. The powder coating waste to be recycled in the process according to the invention can be thermoplastic or in particular duroplastic powder coating materials, which are for example curable by radiation or in particular thermally curable. The powder coating waste can be of pigmented powder coating or of powder clear coat.

The process according to the invention is suitable in particular for recycling high-quality powder coating waste, such as arises for example in the preparation or application of powder coatings used in the automotive industry, such as automotive powder clear coats.

Powder coatings can be described according to the characteristic temperature behaviour of each powder coating, i. e. several characteristic temperatures or discrete temperature ranges exist for each powder coating. Position and breadth of these temperatures or temperature ranges depend on the composition of each powder coating and can be determined by suitable physical methods. One commonly used determination method is for example DSC (differential scanning calorimetry). Powder coatings have a glass transition temperature, below which they are stored. The glass transition temperature of powder coatings is usually not a precisely defined glass transition temperature but for example a 20 to 40° C. wide glass transition temperature range. At temperatures above the glass transition temperature range, for example, powder coatings change into a rubber-elastic state, before the melting temperature range of the powder coatings is reached with a further rise of temperature. The breadth of the melting temperature range of powder coatings is for example from 20 to 150° C. and the lower limit of the melting temperature range is for example from 20 to 50° C. above the upper limit of the glass transition temperature range. The chemical cross-linking of a thermally curable powder coating starts to be noticeable within or above the melting temperature range. Particular importance is given for example therefore to a rapid passage of the melted powder coating in the extruder in the preparation of thermally curable powder coatings. In the case of thermally curable powder coatings, the baking temperature chosen for curing is above the melting temperature range. The flow of a thermally curable powder coating can be controlled by the value of the baking temperature. On one hand, the viscosity of a powder coating melt falls with rising temperature, while on the other hand the speed of the chemical cross-linking of a thermally curable powder coating increases and therewith the viscosity.

For example, using DSC at a heating rate of 10° C./min, a temperature behaviour of current automotive powder clear coats can be determined, which can generally be characterised by 20 to 30° C. wide glass transition temperature ranges with a centre in the range of 30 to 60° C., 40 to 50° C. wide ranges for the rubber-elastic state with a centre in the range of 50 to 100° C. and 20 to 100° C. wide melting temperature ranges with a centre in the range of 90 to 190° C.

In the process according to the invention, single-quality powder coating waste is recycled. Single-quality powder coating wastes are characterised on the basis of an identical chemical composition by an identical temperature behaviour in the sense described above. In the case of pigmented powder coating wastes they are identically pigmented. In other words, the process shall not be carried out with mixtures of powder coating wastes of different composition and powder coating waste and powder coating chips have to be single-quality powder coating materials as well.

In the process according to the invention powder coating waste is bonded to powder coating chips by a heat treatment. For that powder coating waste is brought into contact with powder coating chips, for example, in a weight ratio of 1 part by weight of powder coating waste: 2 to 50, preferably 2 to 10 parts by weight of powder coating chips. The powder coating chips are conventional powder coating chips with a size of 0.5 to 2 cm, which have been prepared by extrusion of powder coating fresh material and coarse comminution, such as are used for the preparation of powder coatings. The powder coating waste is applied to the surface of the powder coating chips. The powder coating chips may thereby be covered by powder coating waste on their entire surface or only on a part thereof. All powder coating chips may, for example, be covered by powder coating waste on the entire surface or only on a part thereof or a part of the powder coating chips is covered on the entire surface, a further part is covered only on a part of the surface and optionally a third part is not covered by powder coating waste or a part of the powder coating chips is covered on a part of the surface and the remaining part is not covered by powder coating waste.

The surface of the powder coating chips may be more or less covered by powder coating waste, depending on the weight ratio of powder coating waste to powder coating chips. The surface of the powder coating chips may for example be covered by powder coating waste to a thickness of up to 5 mm. This layer thickness refers to powder coating waste which is loosely applied, i.e. applied without the use of pressing forces.

The application of the powder coating waste to the surface of the powder coating chips can be carried out in various ways. The powder coating waste can for example be scattered on a layer of powder coating chips which is carried by a conveyor belt. It is therefore practical, albeit not a compulsory condition, that the layer of powder coating chips is sufficiently thick to possibly completely take up the scattered powder coating waste and thus, for example, prevent a partial dripping of powder coating waste through the powder coating chips onto the conveyor belt. The conveyor belt can be formed of a net comprising a suitable mesh size, so that powder coating waste which has reached the conveyor belt falls through it, is collected below and can be scattered again.

The bonding of powder coating waste and powder coating chips is carried out by a heat treatment of the surface of the powder coating chips, in particular the surface of the powder coating chips which are covered by powder coating waste, and of the powder coating waste covering the surface of the powder coating chips. The heat treatment can thereby start before or after the application of the powder coating waste to the powder coating chips. The heat treatment can start for example in that the powder coating waste and/or the powder coating chips or the surface of the powder coating chips are already heated before the application or the impact of the powder coating waste particles on the surface of the powder coating chips, or the heat treatment starts only after the application.

The heat treatment is carried out so that a temperature (theoretical temperature) is set on the surface of the powder coating chips and in the powder coating waste covering the surface of the powder coating chips, which lies within the glass transition temperature range to below the melting temperature range, preferably above the glass transition temperature range, and is maintained until a firm bonding of the powder coating waste with the powder coating chips is obtained. The firm bonding of powder coating waste and powder coating chips is obtained by through-glassing the surface of the powder coating chips together with the powder coating waste covering them, whereby modified powder coating chips are obtained. The melting temperature range shall in no case be reached, likewise thereby avoiding a worth mentioning chemical reaction of the cross-linking system in the case of a thermally curable powder coating material. The temperature on the surface of the powder coating chips and in the powder coating waste covering the surface of the powder coating chips can for example be determined pyrometrically. The heat supply can be controlled accordingly.

The duration of the actual through-glassing process, after the theoretical temperature has been reached, depends for example on the thermal behaviour of the powder coating, the prevailing theoretical temperature and the thickness of the layer of the powder coating waste on the surface of the powder coating chips, and is, for example, within the range of 30 to 60 minutes. Completion of the through-glassing can easily be tested by comparing the breaking behaviour of the modified powder coating chips obtained in the process according to the invention with that of original powder coating chips in the powder coating grinding process. The breaking behaviour of the modified powder coating chips corresponds to that of the original powder coating chips.

The heat treatment can be carried out by different heat supply methods, for example by supplying hot air corresponding to a desired temperature and/or by heat radiation. Heat radiation is preferred. Powder coating chips covered by powder coating waste can for example be irradiated by heat radiation. Heat radiation sources can for example be positioned at a distance of 30 to 100 cm from the surface of the powder coating chips to be irradiated. Conventional sources of infrared- or near infrared-radiation may be used as heat radiation sources, whereby the temperature on the surface of the powder coating chips can be conveniently controlled via power consumption and/or suited clocking of the heat radiation sources.

After completion of the through-glassing the modified powder coating chips are cooled below the glass transition temperature range. The cooling-off can take place after an interruption of the heat supply by temperature equalisation with the surroundings or it can be assisted by heat abstraction, for example by supplying dry cold air, by adding volatile cooling agents such as, for example, dry ice, or liquefied inert gases and/or by cooling-off in a cooled vessel or the like. Care should be taken that no humidity condensates in the modified powder coating chips if extra cooling is used.

If the modified powder coating chips cooled below the glass transition temperature range adhere to each other, these can be detached from each other before being further used, by using low mechanical forces, such as for example by light shaking.

The modified powder coating chips obtained with the process according to the invention practically cannot be distinguished from powder coating chips prepared exclusively from fresh material. The size of the modified powder coating chips is practically unchanged with respect to powder coating chips used in the process according to the invention.

Powder coatings having particle size distributions suitable for application within the theoretical value range can be prepared from the modified powder coating chips. For this purpose, they are subjected to fine milling, conventionally used in the preparation of powder coatings, and to subsequent powder coating classification. Any remaining powder coating waste among the modified powder coating chips does not disturb the fine milling. Any remaining parts of powder coating waste contained in the modified powder coating chips that are too finely grained can be removed at the sieving or sorting stage.

The use of the modified powder coating chips obtained in the process according to the invention for the preparation of powder coatings allows the powder coating preparation and application to be carried out practically without loss. The thus prepared powder coatings correspond to powder coatings prepared exclusively with fresh material, both with respect to their application technology behaviour as with respect to the technological properties of the coatings prepared therewith. The recycled powder coatings can therefore be used for their original purpose, their use not being limited to lower value purposes.

The process according to the invention is easy to carry out and allows recycling of powder coating waste practically without loss. It is carried out without the application of pressing forces on the powder coating waste, which is subjected only to reduced heat exposure. There is no change in composition of the recycling material compared with the fresh powder coating.

EXAMPLE

Automotive powder clear coat-low grind according to the powder coating classification (glass transition temperature range of 26 to 52° C. and a melting temperature range of 90 to 120° C. determined with DSC at a heating rate of 10° C./min) having an average particle size ($d_{50}$) of 10 µm was scattered from above onto automotive powder clear coat chips with a size of 0.5 to 2 cm and covered them to a thickness of 1 to 3 mm. The powder clear coat chips and the powder clear coat waste had identical compositions (single-quality powder coating materials). The weight ratio of powder clear coat waste to powder clear coat chips was 1:4. The powder clear coat chips covered with the powder clear coat waste were irradiated with an infrared radiator, fixed above at a distance of 50 cm (maximum power consumption 6 kW). A surface temperature of the powder clear coat chips of 75° C. (determined pyrometrically) was set and maintained for 50 minutes. It was then cooled to 20° C. Powder clear coat chips with a size of 0.5 to 2 cm (modified powder clear coat chips) were obtained, which could be further processed into a powder clear coat which, after milling and classifying, was not distinguishable in its properties from the original automotive powder clear coat.

What is claimed is:

1. A process for recycling polymeric powder coating wastes comprising the steps of:

a) intimately contacting the powder coating wastes with polymeric powder coating chips to form powder coating chips that are at least partially covered with the powder coating wastes; wherein the powder coating wastes and the powder coating chips have essentially the same composition and the powder coating chips have a particle size of 0.5 to 2 cm and the powder coating wastes have a particle size of 1 to 100 µm and the weight ratio of powder coating wastes to powder coating chips is in the range of 1:2 to 1:50 and wherein the powder coating wastes are applied to a surface thickness of up to 5 mm to the powder coating chips: and b) bonding the powder coating wastes to the powder coating chips by heating the waste covered powder coating chips prepared in step a) to a temperature range within the glass transition temperature range to below the melting temperature range without exceeding the melting temperature range and maintaining that temperature range until a firm bond between the powder coating wastes and the powder coating chips is obtained.

2. The process of claim 1 wherein the powder coating wastes and the powder coating chips are each selected from the same group consisting of thermoplastic and duroplastic powder coating material.

3. The process of claim 1 wherein the powder coating wastes and the powder coating chips are each selected from the same group consisting of pigmented powder coating and powder clear coat.

4. The process of claim 1 wherein the surface of the powder coating chips and the powder coating wastes covering the surface of the powder coating chips are simultaneously subjected to the heat treatment step.

5. The process of claim 1 wherein at least one of the powder coating chips and the powder coating wastes is pre-heated prior to contact with the other.

6. The process of claim 1 wherein the heating step comprises
   a) heating the combination to a temperature range above the glass transition temperature range but below the melting temperature range thereof; and
   b) maintaining the temperature range until a firm bonding of the powder coating wastes with the powder coating chips is obtained.

7. The process of claim 1 wherein the surface of the powder coating chips is through-glassed together with the powder coating wastes covering the powder coating chips to form modified powder coating chips.

8. The process of claim 1 wherein the heating step is carried out by means of a heating source selected from the group consisting of dry hot air, heat radiation, and combinations thereof.

9. The process of claim 8, wherein the heating source consists of heat radiation.

* * * * *